Feb. 27, 1968

D. R. JAMES 3,370,709

UNITARY VALVE AND FILTER ASSEMBLY

Filed Oct. 2, 1964

INVENTOR
DAVID R. JAMES
BY
Irwin S. Thompson

ATTORNEY

Feb. 27, 1968           D. R. JAMES           3,370,709

UNITARY VALVE AND FILTER ASSEMBLY

Filed Oct. 2, 1964           2 Sheets-Sheet 2

INVENTOR
DAVID R. JAMES
BY

ATTORNEY

United States Patent Office 3,370,709
Patented Feb. 27, 1968

3,370,709
UNITARY VALVE AND FILTER ASSEMBLY
David Richard James, Covertside, Hasfield, England, assignor to Williams & James (Engineers) Limited, Gloucester, England, a British company
Filed Oct. 2, 1964, Ser. No. 401,182
Claims priority, application Great Britain, Oct. 5, 1963, 39,305/63
7 Claims. (Cl. 210—234)

ABSTRACT OF THE DISCLOSURE

A valve has a main valve member and a filter element which together form a unitary assembly. This unitary assembly is withdrawable as a whole from the body of the valve and is so arranged that when the valve is open flow through the valve passes through the filter element. Also, an isolating valve member is provided which automatically closes to prevent leakage from the valve when the unitary assembly is withdrawn from the valve body.

---

This invention relates to valves and has for its object to provide a construction of valve which can be used to replace the separate control valve and in-line filter at present used in many installations, for example domestic oil storage tank installations.

To this end a valve in accordance with the invention has a main valve member and filter element assembly which is withdrawable from the valve body and so arranged that when the valve is open flow through the valve passes through the element, an isolating valve member being provided which automatically closes to prevent leakage from the valve when the assembly is withdrawn.

Preferably the filter element is arranged on the upstream side of the main valve member between that member and the isolating valve member. The latter valve member is conveniently urged to the closed position by an associated valve spring and held in the open position by the assembly when the latter is operatively positioned within the body.

The main valve member may be arranged for axial movement towards and away from an associated valve seating to control flow through the valve; in this case the filter element may be in the form of a hollow gauze cylinder which moves axially with the main valve member within a bore in the body. The gauze cylinder conveniently has radial clearance within the bore so that the filtered flow passes radially outwardly through the cylinder wall, suitable sealing means being provided between the end of the cylinder remote from the main valve member and the valve body.

When the valve is of a simple type controlling flow through a single outlet the filter element is preferably attached directly to the main valve member, but in more complex valve arrangements it may be desirable to attach the element to a further member of said assembly. For example, the invention may be employed with a valve as disclosed in our co-pending patent application No. 401,199 in which a main outer rotary valve member controls flow through one outlet and an inner axially displaceable valve member mounted within the outer member controls another outlet. In this case the filter element of the present invention is preferably attached directly to the inner or axially displaceable valve member with the latter also arranged to engage the isolating valve member to hold the latter member in the open position until the valve member and filter element assembly is withdrawn.

The invention will now be further described with reference to the accompanying drawings which illustrate, by way of example, an illustrative embodiment of the invention in the form of a valve designed for use with a domestic oil storage tank installation, and two minor modifications thereof.

Figure 1:
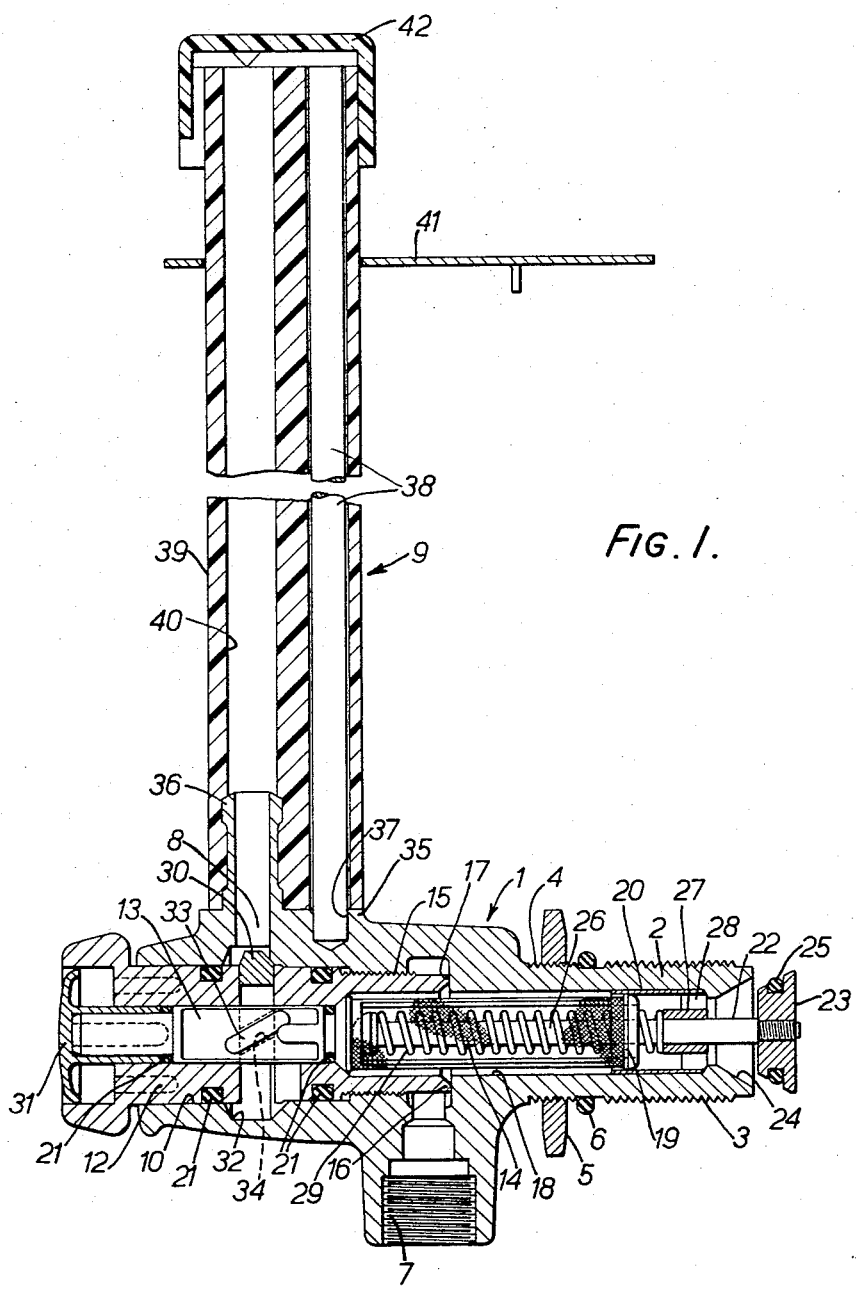
Figure 2:
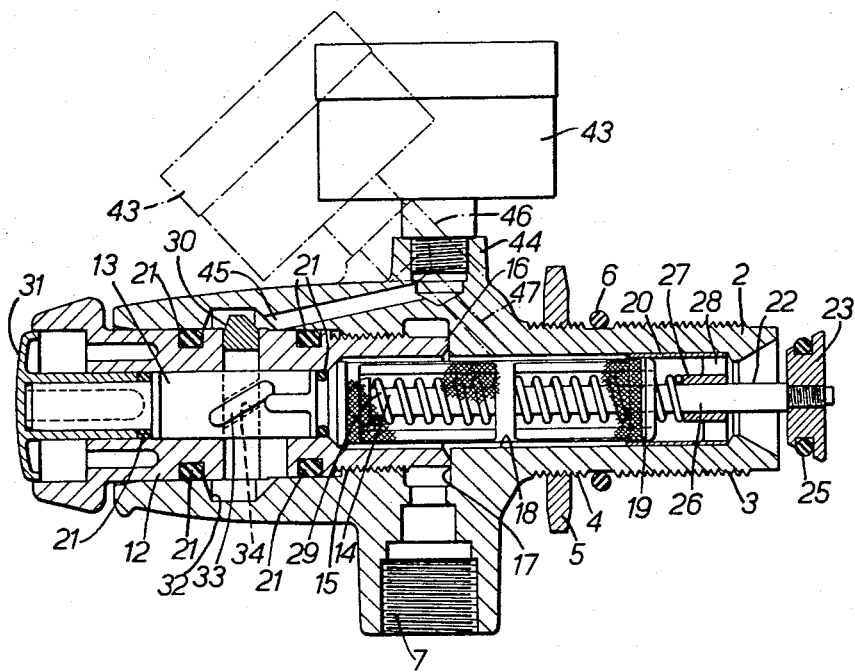

In the drawings:
FIGURE 1 is an axial sectional view of the valve and an associated oil level sight gauge, and
FIGURE 2 is a similar view illustrating the modifications.

The valve has a body 1 with a reduced diameter and externally threaded inner end 2 which enables the valve to be screwed directly into an outlet tapping of the tank. The corresponding screw threads 3 are spaced from screw threads 4 which serve for a locking nut 5 which is tightened to retain the valve in position in the tank. A resilient O ring 6 seals between the threads 3 and 4 and forms a seal at the tank outlet tapping. The valve has two outlet bores 7 and 8 for connection respectively to an oil feed pipe (not shown) and an oil level sight gauge 9.

The valve body has a through bore and is counterbored from the outer end at 10 to provide a housing for an outer rotary valve member 12 controlling the feed outlet 7 and an inner axially displaceable valve member 13. The member 13 is mounted centrally within the rotary member 12 and controls flow through the latter member to the level gauge outlet 8. Both valve members 12 and 13 form part of a valve member and filter element 14 assembly in accordance with the present invention, the outer valve member 12 being moulded from a synthetic plastic material such as nylon with an external thread at 15 engaging an internal thread within the valve body 1. Thus rotation of the assembly 12, 13, 14 produces axial movement of the latter within the valve body 1 and hence movement of an integral inner end sealing lip 16 on the valve member 12 relatively to the base 17 of the counterbore 10 which provides the main valve seating adjacent which the feed outlet 7 communicates with the counterbore 10.

The filter element 14 is in the form of a hollow gauze cylinder attached directly to the inner end of the valve member 13 of the assembly. The free or inner end of the gauze cylinder 14 is open and a radial clearance is provided between the cylinder and the bore 18 in the valve body 1 within which it is centrally disposed so that the oil flow from the tank through the valve passes radially outwardly through the cylinder wall. At its inner end the cylinder 14 has an attached outwardly projecting radial lip 19 of a synthetic plastic material which engages the wall of a sleeve 20 in the inner end of the valve body during movement of the assembly; this provides a seal which ensures that the oil flow must pass through the filter element and hence be filtered. Leakage from the body 1 past the valve members 12 and 13 is prevented by O-ring seals 21 associated with those members.

An isolating valve member 22 at the inner end of the valve body has a head 23 arranged for engagement with a frusto-conical seating 24 at the inner end of the body 1 to provide a seal which prevents leakage from the valve when the valve member and filter assembly 12, 13, 14 is withdrawn from the body 1 for inspection and servicing, for example to clean the filter. The head 23 is fitted with an O-ring seal 25.

The valve member 22 has a stem 26 which is slidable in a guide ring 27 positioned within the valve body bore 18 just adjacent the seating 24. The guide ring is formed integrally with the sleeve 20 and connected thereto by radial ribs such as 28 between which the oil flow passes. The ring 27 also forms a spring abutment for a valve spring 29 which engages an opposed abutment at the end of the stem 26 of the valve member 22; thus the spring 29 urges the valve member 22 to the closed isolating position. The end of the valve stem 26 engages the inner end of the inner valve member 13 of said assembly, and when the assembly is operatively positioned within the valve body 1 (as shown in the drawings) the valve member 22 is held in the open position with the head 23 thereof disposed externally of the valve body 1. In this position the spring 29 also provides a spring force urging the inner valve member 13 to its normal closed position.

Axial displacement of the valve member 13 serves not only to allow flow through the valve member 12 past the member 13 to the outlet 8 when the tank level is to be checked, but also frees a U-shaped locking member or stirrup 30 which normally acts to prevent the assembly 12, 13, 14 being completely unscrewed from the body 1 accidentally. When the stirrup 30 is moved to a release position the valve member and filter assembly 12, 13, 14 can be unscrewed completely and then removed from the valve body for servicing purposes. This allows the head of the isolating valve 22, under the influence of the spring 29, to engage the seating 24 and thus prevent leakage from the valve until the assembly is refitted. The length of the isolating valve member 22 is such that it closes before the assembly is fully unscrewed.

The stirrup 30 embraces the valve member 13 with the stirrup limbs received within a radial bore in the member 12. The head of the stirrup as shown is normally disposed in an annular recess 32 in the counterbore 10 which provides a communication with the outlet 8. Thus axial movement of the rotary valve member 12 is limited by the width of the recess 32. Skewed projecting ribs 33 moulded on the valve member 13 engage grooves 34 in the limbs of the stirrup 30 with a camming action and act to position the stirrup 30 radially of the valve body 1. As can be seen from the drawings, the camming action is such that axial displacement of the valve member 13 acts to move the stirrup 30 inwards until clear of the recess 32.

In the valve as shown in FIGURE 1 the body 1 has an upper boss 35 with a flat face from which projects a ferrule connection 36 for the outlet 8. The boss 35 has a bore 37 providing a mounting for a rigid rod 38 which passes through one bore of a transparent synthetic plastic tube 39 of figure-8 extruded form. These items 38 and 39 form the major components of the sight gauge 9, the liquid level appearing in the other bore 40 of the tube 39 which is slipped over the ferrule 36. The rod 38 maintains the tube 39 straight. At the upper end the gauge 9 is supported by a bracket 41 attached to the top of the tank, and vented and closed by a moulded fitting cap 42.

The two modifications are spectively shown in FIGURE 2 in full and broken lines, and in each case the liquid sight gauge 9 is replaced by a Bourbon type indicating gauge 43 responsive to the pressure head. In one modification (in full lines) the boss 35 is replaced by a screwed boss 44 with the gauge 43 facing directly upwards when fitted. A bore 45 in the body 1 leads from the recess 32 to the boss 44 and provides the valve outlet controlled by the valve member 13.

An inclined boss 46 is used in the other modification, providing an inclined fitted position for the gauge 43 which will often be more convenient to read. The boss 46 communicates directly with the main valve bore 18 through a bore 47, the bore 45 being omitted. Thus the gauge 43 constantly communicates with the tank, if the valve 22 is open, and axial displacement of the member 13 now serves merely to operate the locking stirrup 30.

I claim:

1. A valve having a valve body providing an inlet and an outlet, a main valve member mounted for rotary movement in the valve body, a filter element forming a unitary assembly with the main valve member, means removably mounting said unitary assembly in the valve body, an isolating valve member which is axially displaceable, spring means biasing said isolating valve member to a closed position in which it seals said inlet, the main valve member being operable to control flow from the inlet and through the filter element to the outlet, and the isolating valve member normally being held open by said unitary assembly and automatically closing under the action of the spring loading when said assembly is withdrawn from the valve body.

2. A valve according to claim 1, wherein the filter element is arranged on the upstream side of the main valve member between that member and the isolating valve member.

3. A valve having a valve body providing an inlet at one end of the body and a side outlet and a bore, a main valve member mounted for rotary movement in said bore of the valve body, the main valve member projecting from the opposite end of the body for manual valve operation and the valve bore being stepped to define a main valve seat adjacent the outlet on the upstream side thereof, a filter element also mounted in the bore and forming a unitary assembly with the main valve member, means removable mounting said unitary assembly in the valve body, an isolating valve member which is axially displaceable, spring means biasing said isolating valve member to a closed position in which it seals said inlet, the main valve member being operable to control flow from the inlet and through the filter element to the outlet, and the isolating valve member normally being held open by said unitary assembly and automatically closing under the action of the spring loading when said assembly is withdrawn from the valve body.

4. A valve according to claim 3, wherein the filter element is in the form of a hollow gauze cylinder with an open end facing said inlet and having a radial clearance within said bore, so that filtered flow passes radially outwardly through the cylinder gauze.

5. A valve having a valve body providing an inlet and an outlet, a main valve member screw-threaded in the valve body for rotary valve-adusting movement, a filter element forming a unitary assembly with the main valve member, means for withdrawing said unitary assembly by a screwing action from the valve body, an isolating valve member which is axially displaceable, spring means biasing said isolating valve member to a closed position in which it seals said inlet, and locking means which limit unscrewing movement to prevent inadvertent withdrawal of the assembly, the main valve member being operable to control flow from the inlet and through the filter element to the outlet, and the isolating valve member normally being held open by said unitary assembly and automatically closing under the action of the spring loading when said assembly is withdrawn from the valve body after release of said locking means.

6. A valve according to claim 5 and having an externally projecting and axially displaceable member mounted in the main valve member arranged to release said locking means on being depressed axially.

7. A valve according to claim 6, wherein the filter element is mounted on said axially displaceable member.

References Cited

UNITED STATES PATENTS

| | | | |
|---|---|---|---|
| 922,657 | 5/1909 | Worsey | 210—234 |
| 1,768,212 | 6/1930 | Reedy | 137—329.4 |
| 2,005,445 | 6/1935 | Wiedhofft | 137—329.4 |
| 2,775,256 | 12/1956 | Hanson | 137—329.1 X |
| 2,793,752 | 5/1957 | Jay | 210—234 X |
| 3,283,907 | 11/1966 | Whiting | 210—234 |

FOREIGN PATENTS

| | | |
|---|---|---|
| 1,166,380 | 6/1958 | France. |
| 1,065,683 | 9/1959 | Germany. |

REUBEN FRIEDMAN, *Primary Examiner.*

D. M. RIESS, *Assistant Examiner.*